US010528375B2

(12) United States Patent
Rayanagouda et al.

(10) Patent No.: US 10,528,375 B2
(45) Date of Patent: Jan. 7, 2020

(54) MAINTAINING SECURITY SYSTEM INFORMATION IN VIRTUALIZED COMPUTING ENVIRONMENTS

(71) Applicant: NICIRA, INC., Palo Alto, CA (US)

(72) Inventors: Patil Rayanagouda, Pune (IN); Vasantha Kumar, Pune (IN); Anil Kumar, Pune (IN); Hrishikesh Ghatnekar, Pune (IN)

(73) Assignee: NICIRA, INC., Palo Alto, CA (US)

( * ) Notice: Subject to any disclaimer, the term of this patent is extended or adjusted under 35 U.S.C. 154(b) by 92 days.

(21) Appl. No.: 15/299,490

(22) Filed: Oct. 21, 2016

(65) Prior Publication Data
US 2018/0052703 A1    Feb. 22, 2018

(30) Foreign Application Priority Data
Aug. 22, 2016  (IN) .............................. 201641028576

(51) Int. Cl.
*G06F 9/46* (2006.01)
*G06F 9/455* (2018.01)
*G06F 21/57* (2013.01)
*G06F 21/53* (2013.01)
*G06F 21/56* (2013.01)

(52) U.S. Cl.
CPC .......... *G06F 9/45558* (2013.01); *G06F 21/53* (2013.01); *G06F 21/564* (2013.01); *G06F 21/57* (2013.01); *G06F 2009/4557* (2013.01); *G06F 2009/45587* (2013.01)

(58) Field of Classification Search
CPC .... G06F 9/45558; G06F 21/53; G06F 21/464; G06F 21/57; G06F 2009/4557; G06F 2009/45587
See application file for complete search history.

(56) References Cited

U.S. PATENT DOCUMENTS

| | | | | |
|---|---|---|---|---|
| 9,880,756 | B2* | 1/2018 | Mutalik | ................ G06F 3/0619 |
| 2009/0169020 | A1* | 7/2009 | Sakthikumar | ........... G06F 21/57 |
| | | | | 380/278 |
| 2009/0328193 | A1* | 12/2009 | Moore | .................... G06F 21/53 |
| | | | | 726/15 |
| 2012/0102258 | A1* | 4/2012 | Hepkin | ............... G06F 9/45558 |
| | | | | 711/6 |
| 2018/0006999 | A1* | 1/2018 | Doukhvalov | ........... H04L 63/20 |

* cited by examiner

*Primary Examiner* — Camquy Truong
(74) *Attorney, Agent, or Firm* — SU IP Consulting (57) ABSTRACT

Example methods are provided for a host to maintain security system information in a virtualized computing environment, in which the host supporting a security system to secure a source virtualized computing instance. The method may include, based on an operation associated with the source virtualized computing instance, determining to maintain security system information associated with the security system. The method may further include obtaining the security system information that includes first information from the source virtualized computing instance, or second information from a source security virtualized computing instance, or both. The source virtualized computing instance may implement a first component of the security system and the source security virtualized computing instance a second component of the security system. The method may further include sending the first information to a destination virtualized computing instance, or the second information to a destination security virtualized computing instance, or both.

21 Claims, 9 Drawing Sheets

MAINTAINING SECURITY SYSTEM INFORMATION IN VIRTUALIZED COMPUTING ENVIRONMENTS

RELATED APPLICATIONS

Benefit is claimed under 35 U.S.C. 119(a)-(d) to Foreign application Serial No. 201641028576 filed in India entitled "MAINTAINING SECURITY SYSTEM INFORMATION IN VIRTUALIZED COMPUTING ENVIRONMENTS", on Aug. 22, 2016, by NICIRA, INC., which is herein incorporated in its entirety by reference for all purposes.

BACKGROUND

Unless otherwise indicated herein, the approaches described in this section are not admitted to be prior art by inclusion in this section.

Virtualization allows the abstraction of hardware resources and the pooling of these resources to support multiple virtual machines in a virtualized computing environment. For example, through virtualization, virtual machines running different operating systems may be supported by the same physical machine (e.g., referred to as a "host"). Each virtual machine is generally provisioned with virtual resources that provide similar functions as the physical hardware of the host, such as central processing unit (CPU) resources, memory resources, storage resources and network resources to run an operating system and applications. However, similar to physical machines, virtual machines are susceptible to attacks from malicious software (i.e., malware) designed to compromise operations of the virtual machines.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
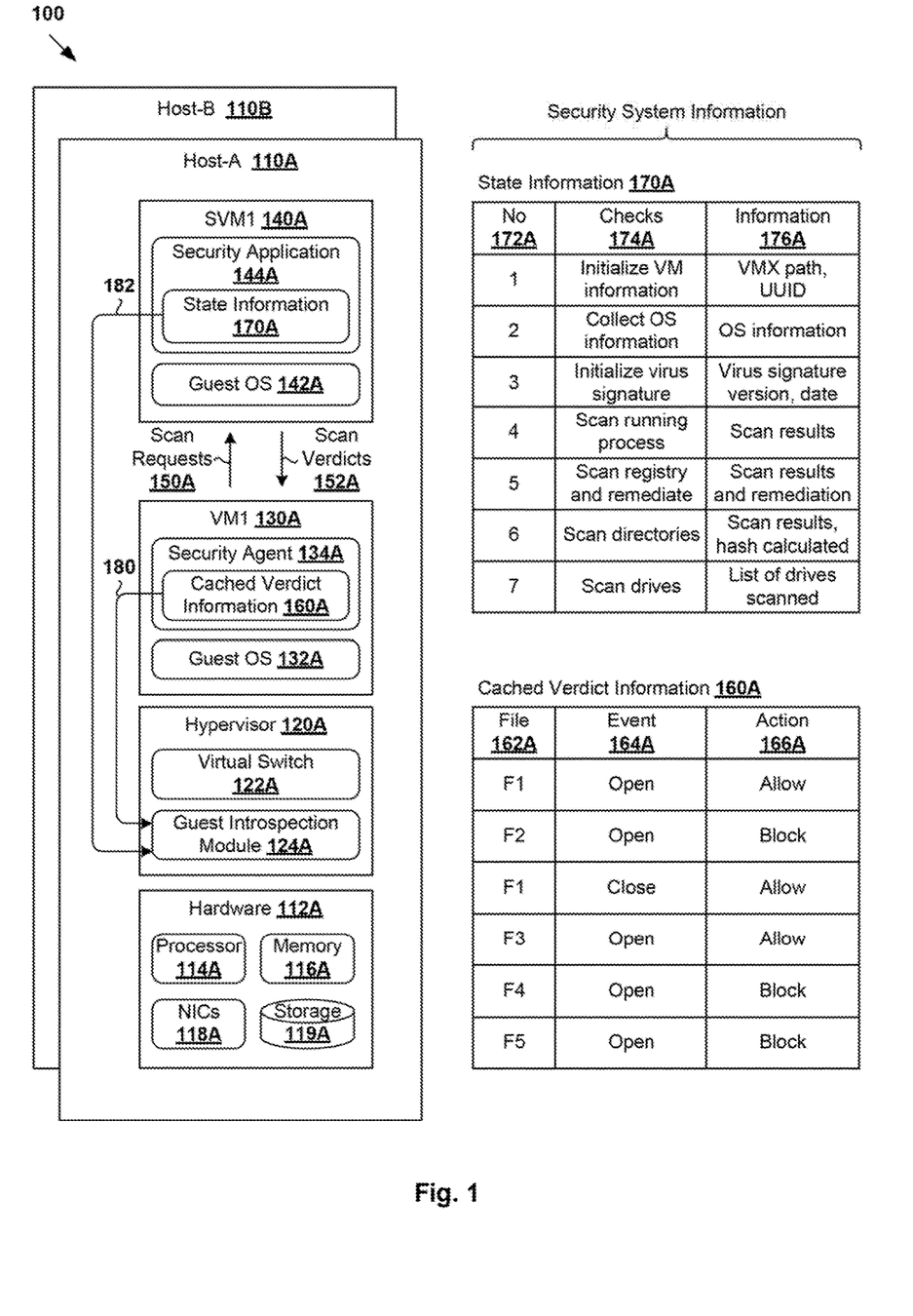
FIG. 1 is a schematic diagram illustrating an example virtualized computing environment in which security system information is maintained.

The challenges of securing virtual machines will now be further explained using FIG. 1, which is a schematic diagram illustrating an example virtualized computing environment 100 in which security system information is maintained. Although an example is shown, it should be understood that virtualized computing environment 100 may include additional or alternative components than that shown, and each component may have a different configuration.

In the example in FIG. 1, virtualized computing environment 100 includes multiple hosts (also known as "host computers", "physical servers", "server systems", "host computing systems", etc.), such as Host-A 110A and Host-B 110B, etc. In the following, reference numerals with a suffix "A" relates to elements of Host-A 110A and suffix "B" relates to Host-B 110B. For example in FIG. 1, Host-A 110A includes suitable hardware 112A such as processor 114A (e.g., central processing unit (CPU)); memory 116A (e.g., random access memory); network interface controllers (NICs) 118A to provide network connection; and storage 119A that includes one or more storage disks. Host-A 110A further executes virtualization software such as hypervisor 120A to maintain a mapping between physical resources of hardware 112A and virtual, resources assigned to various virtual machines, such as "VM1" 130A and "SVM1" 140A.

For example, corresponding to hardware 112A, virtual resources assigned to each virtual machine may include virtual CPU, virtual memory, virtual disk(s), virtual NIC(s), etc. In practice, hypervisor 120A may also be a "type 2" or hosted hypervisor that runs on top of a conventional operating system (OS) on host 110A. Host-A 110A may support any number of virtual machines, with each virtual machine 130A/140A executing guest OS 132A/142A and suitable applications. Hypervisor 120A further supports virtual switch 122A to handle packets to and from virtual machines. Although not shown in FIG. 1 for simplicity, Host-B 110B also includes similar hardware and virtualization software (e.g., see corresponding hardware 112B, CPU 114B, memory 116B, NIC(s) 118B, hypervisor 120B, virtual switch 122B in FIG. 4, FIG. 5 and FIG. 6).

Although examples of the present disclosure refer to "virtual machines," it should be understood that virtual machines running within a virtualized computing environment are merely one example of "virtualized computing instances." In general, a virtualized computing instance or workload may represent an addressable data compute node or isolated user space instance. In practice, any suitable technologies aside from hardware virtualization may be used to provide isolated user space instances. For example, other virtualized computing instances may include physical hosts, client computers, containers (e.g., running on top of a host OS without the need for a hypervisor or separate OS such as Docker; or implemented as an OS-level virtualization), virtual private servers, etc. The virtual machines may also be complete computation environments, containing virtual equivalents of the hardware and system software components of a physical computing system.

To provide protection against harmful malware, each host 110A/110B implements a "security system" having multiple components distributed among several virtual machines. In relation to Host-A 110A, a first component of the security system (e.g., security agent 134A) resides on "VM1" 130A. A second component (e.g., security application 144A) resides on a security virtual machine in the form of "SVM1" 140A. The security system also includes guest introspection module 124A, which acts as a control module that interacts with security application 144A and security agent 134A. In practice, "SVM1" 140A may be deployed using a security virtual appliance (SVA) delivered as an Open Virtualization Format (OVF) package.

As used herein, the term "security system" may refer generally to any suitable computer program(s) for securing virtualized computing instances (e.g., "VM1" 130A) against malware. The term "malware" is used as an umbrella term to cover various forms of hostile or intrusive software, such as viruses, worms, Trojan horse programs, spyware, phishing, adware, riskware, rookits, spares, scareware, ransomware, a combination thereof, etc. In practice, the security system may be an "agentless" antivirus system, in which case security agent 134A may be a thin agent that is executed as part of guest OS 132A of "VM1" 130A. The thin agent has smaller footprint compared to a conventional agent that includes file filter, scan engine and virus signatures at the virtual machine. In the example in FIG. 1, "SVM1" 140A may be from any suitable vendor such as Trend Micro, Inc., McAfee, Inc., etc. Using security agent 134A, it is not necessary for "VM1" 130A to implement an individual agent for each vendor.

To implement the security system, a connection is established between quest introspection module 124A and security agent 134A of "VM1" 130A, such as through VMware's Virtual Machine Communication Interface (VMCI), etc. Another connection is established between guest introspection module 124A and "SVM1" 140A, such as through Transmission Control Protocol Internet Protocol (TCP/IP), etc. This way, "SVM1" 140A is not directly accessible from "VM1" 130A and thereby protected against attacks from "VM1" 130A. Security agent 134A on "VM1" 130A is designed to monitor events occurring within "VM1" 130A and, based on the events, send scan requests 150A to "SVM1" 140A. Examples of monitored events include file opening and closing events, system calls, etc. Each scan request 150A may include any suitable information, such as information about a file or object that needs a security check (e.g., antivirus scan), type of file, location of file, the event monitored, etc.

"SVM1" 140A is a dedicated virtual machine to perform security checks based on scan requests 150A. For example, security application 144A may perform antivirus scanning using a signature analysis of files, such as based on a hash sum comparison, etc. A signature may be part of a checksum, executable code or some other binary string that helps to detect whether a file is infected by the corresponding virus. To perform signature analysis, "SVM1" 140A accesses a list of signatures (e.g., stored on storage 119A) that is generally updated by a security system vendor as new virus signatures are discovered. Once completed, "SVM1" 140A reports scan results 152A to "VM1" 130A.

By distributing various components among different virtual machines, the security system may be implemented more efficiently. For example, offloading the tasks of scanning to "SVM1" 140A ensures that expensive hard disk operations (e.g., to access files and signature list) occur from "SVM1" 140A, instead of from tens or hundreds other virtual machines supported by Host-A 110A. This also ensures that "VM1" 130A is not burdened by the security checks, which may take a long time and cause delay to other virtual machines operations. Although signature analysis is discussed as an example, it should be understood that security application 144A may rely on any suitable scanning technology, such as heuristic analysis, etc.

To implement the security system, security agent 134A of "VM1" 130A stores cached verdict information 160A (e.g., in a cache), and security application 144A of "SVM1" 140A stores state information 170A associated with "VM1" 130A and any other virtual machine protected by "SVM1" 140A. Storing state information 170A outside of "VM1" 130A avoids exposure of state information 170A to potential malware in "VM1" 130A. In practice, each host 110A/110B may support multiple security virtual machines (not shown for simplicity), each security virtual machine protecting any suitable number of virtual machines.

Cached verdict information 160A may include a list of files (see 162A) and their respective events (see 164A) and actions (see 166A) based on scan verdicts 152A from "SVM1" 140A. For example in FIG. 1, events associated with respective files labelled "F1," "F3" "F4," and "F5" are allowed, while an open event of "F2" is blocked. Cached verdict information 160A is stored (e.g., temporarily in a cache) by security agent 134A to improve performance so that, for example, scan requests 150A are not generated for unmodified files. Although not shown in FIG. 1 for simplicity, events relating to file read and write, and system calls may be monitored.

State information 170A may relate to a series of vendor-dependent security checks (see 172A, 174A, 176A) implemented by security application 144A. For example in FIG. 1, at a first step, security application 144A initializes and stores information relating to "VM1" 130A, including path information (e.g., path to .VMX configuration file) and universally unique identifier (UUID) associated with "VM1" 130A. At a second step, security application 144A collects OS information relating to guest OS 132A of "VM1" 130A and stores associated OS information and updates performed. For example, OS version and update information may be collected through security agent 134A. At a third step, security application 144A initializes definition of virus signatures and stores associated information, such as version of the virus signature, date and time updated, etc. The virus signatures are compared against various files or objects during scanning.

A full scan may include various security checks. For example, at a fount h step, security application 144A scans running processes on "VM1" 130A and stores associated scan results. At a fifth step, security application 144A scans the system registry of "VM1" 130A, performs any required remediation (e.g., repair or remove infected files), and stores associated results and remediation performed. At a sixth step, security application 144A scans file directories of "VM1" 130A and stores associated results and hash values calculated. At a seventh step, security application 144A scans drives on "VM1" 130A and stores associated information. In practice, security application 144A of "SVM1" 140A may perform any additional and/or alternative security checks than that shown in FIG. 1.

Conventionally, there are various scenarios in which the performance of the security system may be adversely affected. For example, scanning will be temporarily disabled when there is a need to upgrade "SVM1" 140A, in which case "VM1" 130A is exposed to potential malware. One solution is to migrate "VM1" 130A to a different Host-B 110B (e.g., in a different cluster) to protect "VM1" 130A using another security virtual machine. However, the migration necessitates a repeat of the full scan (e.g., checks 174A) performed by "SVM1" 140A for "VM1" 130A. Since scanning is resource-intensive, repeating the full scan generally causes significant additional processing overhead at Host-B 110B. Further, cached verdict information 160A is cleared during the migration process, which may hamper the performance of security agent 134A.

Maintaining Security System Information

According to examples of the present disclosure, security system information may be maintained to improve the performance of a security system. As used herein, the term "security system information" may refer generally to any suitable information required by a security system to secure a virtual machine. In relation to "VM1" 130A, the security system information may include cached verdict information 160A, or state information 170A, or both. For example, during migration of "VM1" 130A, state information 170A and cached verdict information 160A may be maintained to facilitate a reuse at destination Host-B 110B. This way, the need to repeat a resource-intensive full scan may be reduced or avoided at destination Host-B 110B.

Figure 2:
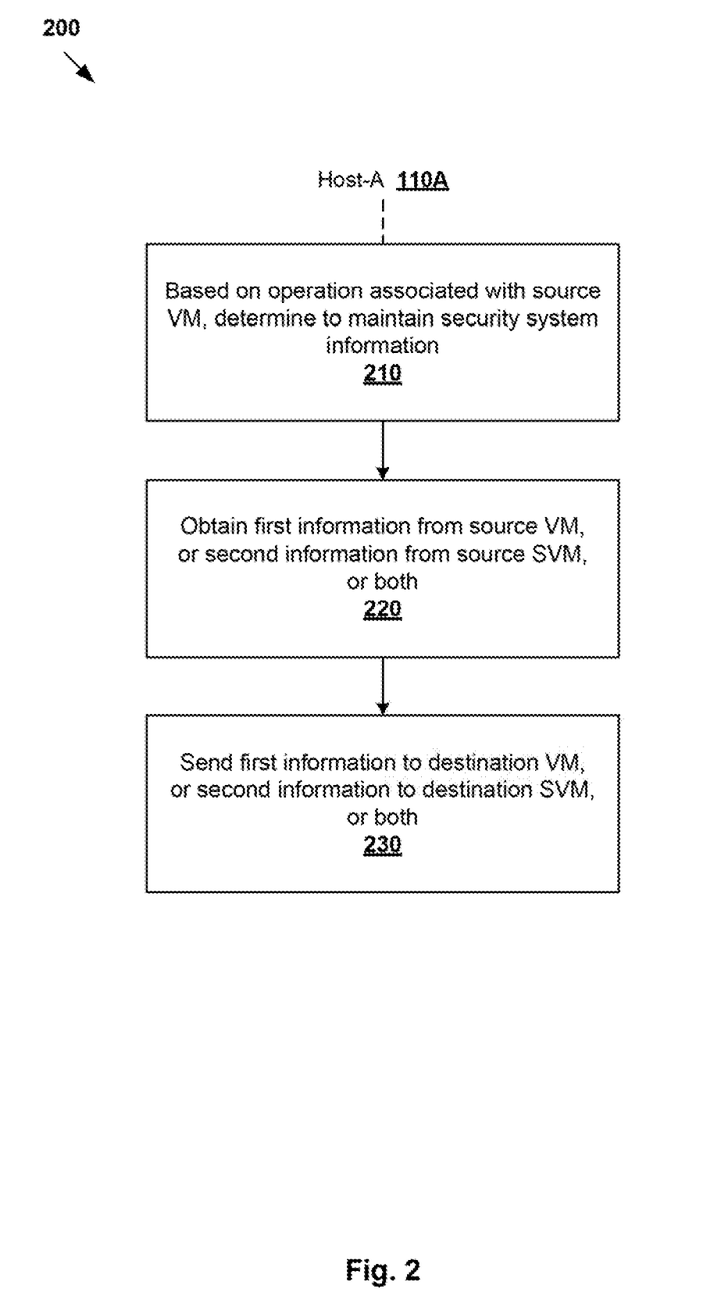
FIG. 2 is a flowchart of an example process to maintain security system information in a virtualized computing environment.

In more detail, FIG. 2 is a flowchart of example process 200 for a host to maintain security system information in virtualized computing environment 100. Example process 200 may include one or more operations, functions, or actions illustrated by one or more blocks, such as blocks 210 to 230. The various blocks may be combined into fewer blocks, divided into additional blocks, and/or eliminated based upon the desired implementation. In practice, example process 200 may be performed by a host, such as Host-A 110A, using any suitable module, such as guest introspection module 124A, etc. In the following, "VM1" 130A will be used as an example "source virtualized computing instance" and "SVM1" 140A as an example "source security virtualized computing instance."

At 210 in FIG. 2, based on an operation associated with "VM1" 130A, Host-A 110A determines to maintain security system information associated with a security system. As will be explained further using FIG. 3 to FIG. 8, the term "operation" may refer to any action or process associated with "VM1" 130A, such as migration, deployment, suspension and resumption of "VM1" 130A, fault tolerance for "VM1" 130A; load balancing for "SVM1" 140A associated with "VM1" 130A, etc.

At 220 in FIG. 2, Host-A 110A obtains security system information that includes cached verdict information 160A ("first information") from "VM1" 130A, or state information 170A ("second information") from "SVM1" 140A, or both. See corresponding 180 and 182 in FIG. 1. As explained using FIG. 1, "VM1" 130A implements security agent 134A ("first component") and "SVM1" 140A implements security application 144A ("second component") of the security system. As used herein, the term "obtain" may refer generally to retrieving information 160A/170A from source 130A/140A, or causing source 130A/140A to send or provide access to information 160A/170A, etc.

At 230 in FIG. 2, Host-A 110A sends cached verdict information 160A to a destination virtual machine, or state information 170A to a destination security virtual machine, or both. Depending on the operation at 210 in FIG. 2, the destination virtual machine and destination security virtual machine may reside on a different host (e.g., Host-B 110B in FIG. 4, FIG. 5 and FIG. 6), or the same host (e.g., Host-A 110A itself in FIG. 7 and FIG. 8).

Examples of the present disclosure may be applied in various scenarios in which it is advantageous to maintain the security system information. In the following, various examples will be explained using. FIG. 3 to FIG. 8. In particular, a detailed example process will be described using FIG. 3; virtual machine migration operation using FIG. 4; virtual machine fault tolerance operation using FIG. 5; virtual machine deployment operation using FIG. 6; virtual machine suspension and resumption operation using FIG. 7; and load balancing operation using FIG. 8.

Detailed Process

Figure 3:
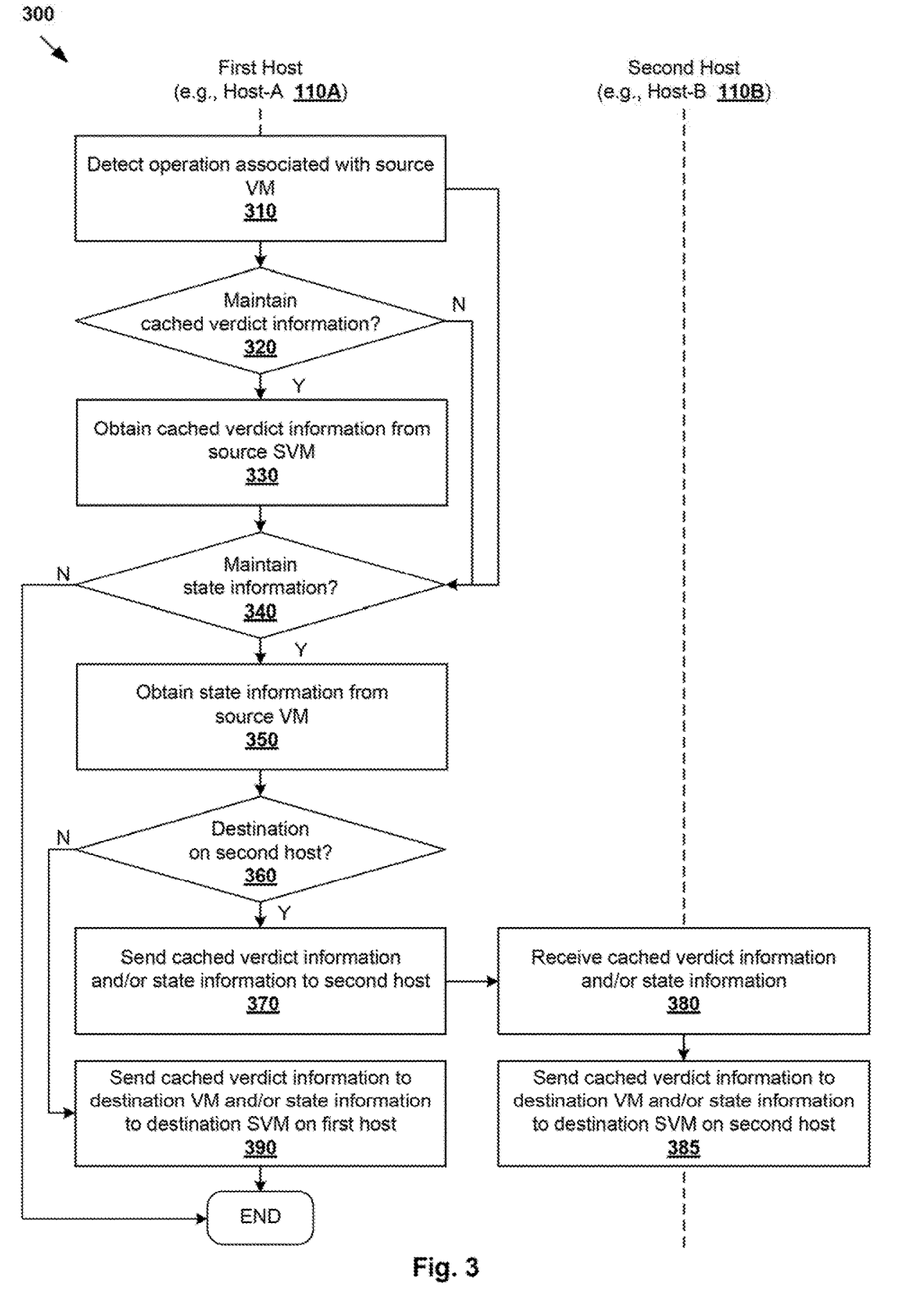
FIG. 3 is a flowchart of an example detailed process to maintain security system information in a virtualized computing environment.

FIG. 3 is a flowchart of example detailed process 300 to maintain security protection information in virtualized computing environment 100. Example detailed process 300 may include one or more operations, functions, or actions illustrated by one or more blocks, such as blocks 310 to 390. The various blocks may be reordered, combined into fewer blocks, divided into additional blocks, and/or eliminated based upon the desired implementation. Similar to the example in FIG. 2, Host-A 110A may implement detailed process 300 using any suitable module, such as guest introspection module 124A, etc.

At 310 in FIG. 3, guest introspection module 124A detects an operation associated with source "VM1" 130. In practice, the operation may be detected based on an instruction from any suitable source, such as another module implemented by Host-A 110A, another host, an external source (e.g., management entity in the form of vCenter server, a trademark of VMware, Inc.), etc.

At 320 and 340 in FIG. 3, based on the operation, guest introspection module 124A determines whether to maintain cached verdict information 160A or state information 170A, or both. Depending on the operation detected at 310 in FIG. 3, maintaining cached verdict information 160A allows persistent caching of scan verdicts for "VM1" 130A. Further, state information 170A may be maintained to facilitate its reuse at a destination security virtual machine. It should be understood that blocks 320 and 340 may be performed in any preferred order, or concurrently in practice.

If maintenance of security system information is not required at both 320 and 340 in FIG. 3, process 300 ends. Otherwise, at 330 in FIG. 3, cached verdict information 160A is obtained from "VM1" 130. Alternatively or additionally, at 350 in FIG. 3, state information 170A is obtained from "SVM1" 140A responsive to an affirmative determination at 340. As discussed using FIG. 2, guest introspection module 124A may obtain information 160A/170A by retrieving information 160A/170A from source 130A/140A. In another example, guest introspection module 124A may obtain information 160A/170A by causing (e.g., signaling, triggering, etc.) source 130A/140A to send information 160A/170A or providing access to 160A/170A. Guest introspection module 124A may obtain information 160A/170A by invoking a registered callback function, etc.

At 360 in FIG. 3, guest introspection module 124A determines whether the destination virtual machine of cached verdict information 160A or destination security virtual machine of state information 170A, or both, are on a different host, such as Host-B 110B. If yes (i.e., different host), at 370 in FIG. 3, guest introspection module 124A sends information 160A/170A to its destination on Host-B 110B. Some examples will be explained using FIG. 4, FIG. 5 and FIG. 6 below.

Otherwise (i.e., same host), at 390 in FIG. 3, guest introspection module 124A sends information 160A/170A to its destination on Host-A 110A itself. Information 160A/170A may be sent before, during or after the operation is performed. Some examples will be explained using FIG. 7 and FIG. 8 below.

Example 1: Virtual Machine Migration

Figure 4:
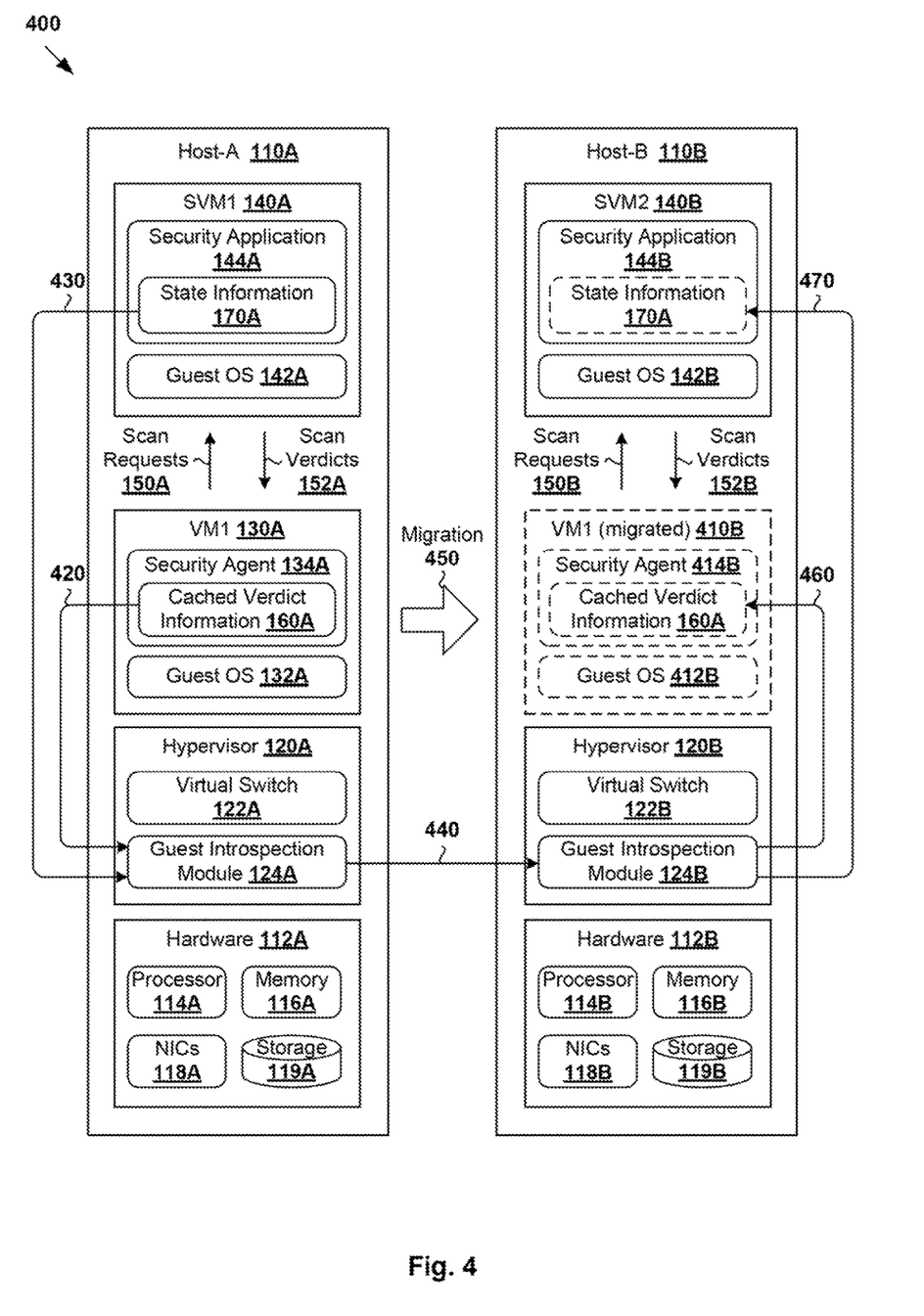
FIG. 4 is a schematic diagram illustrating a first example virtualized computing environment in which security system information is maintained according to the example process in FIG. 3.

In relation to an operation to migrate "VM1" 130A, FIG. 4 is a schematic diagram illustrating first example virtualized computing environment 400 in which security system information is maintained according to example process 300 in FIG. 3. Although an example is shown, it should be understood that virtualized computing environment 400 in FIG. 4 may include additional or alternative components, and each component may have a different configuration.

In the example in FIG. 4, migration of "VM1" 130A may be required for various reasons. As discussed using FIG. 1, the migration may be performed when "SVM1" 140A requires an upgrade, during which all scans will be temporarily disabled. To ensure that "VM1" 130A is not exposed to malware during the upgrade, guest introspection module 124A or any alternative entity may migrate "VM1" 130A to destination Host-B 110B. In another example, "VM1" 130A may be migrated to Host-B 110B to reduce the resource utilization of Host-A 110A, or when host or network failure is detected at Host-A 110A. The migration operation may be triggered at Host-A 110A by a management entity (e.g., VMware's vCenter server), distributed resource scheduler (DRS), etc.

Conventionally, when migrated from source Host-A 110A to destination Host-B 110B, cached verdict information 160A of "VM1" 130 will be cleared. Further, after "VM1" 130A is migrated to Host-B 110B, there will be performance overhead at Host-B 110B for "SVM2" 140B to re-initiate a full scan to perform various security checks for "VM1" 130A (see 174A). According to examples of the present disclosure, the performance overhead may be reduced during the migration process by maintaining cached verdict information 160A of "VM1" 130A and state information 170A of "SVM1" 140A for reuse at destination Host-B 110B.

At 420 and 430 in FIG. 4, based on an operation to migrate "VM1" 130A from Host-A 110A to Host-B 110B, guest introspection module 124A obtains cached verdict information 160A from "VM1" 130A ("source virtualized computing instance") and state information 170A from "SVM1" 140A ("source security virtualized computing instance"). At 440 and 450 in FIG. 4, as part of the migration operation, guest introspection module 124A at Host-A 110A sends cached verdict information 160A and state information 170A to guest introspection module 124B at Host-B 110B. See corresponding blocks 310 to 370 in FIG. 3. "VM1" 130A may be migrated using any suitable approach, such as VMware's vMotion technology (trademark of VMware), etc.

In the example in FIG. 4, once migrated to Host-B 110B, "VM1" 130A is represented using "VM1" 410B (shown in dotted lines), which similarly implements security agent 414B (equivalent to 134A) on, guest OS 412B (equivalent to 132A). To secure "VM1" 410B after its migration, guest introspection module 124B establishes a connection with migrated "VM1" 410B (e.g., VCM). Guest introspection module 124B also maintains a connection with "SVM2" 140B (e.g., TCP/IP). Similar to "SVM1" 140A, "SVM2" 140B implements a scanning component in the form of security application 144B on guest OS 142B. "SVM2" 140B provides scan verdicts (see 152B) to "VM1" 410B after performing security checks in response to scan requests (see 150B) based on file events detected by "VM1" 410B.

At 460 in FIG. 4, guest introspection module 124B at Host-B 110B restores cached verdict information 160A on migrated "VM1" 410B ("destination virtualized computing instance"). Further, at 470 in FIG. 4, guest introspection module 124B sends state information 170A obtained from "SVM1" 140A at Host-A 110A to "SVM2" 140B ("destination security virtualized computing instance") at Host-B 110B. See corresponding blocks 380 and 385 in FIG. 3.

After "VM1" 130A is migrated, it is not necessary for "SVM2" 140B to perform a full scan for "VM1" 130A. In practice, cached verdict information 160A may include scan verdicts that are validated for particular virus signatures. When virus signatures are updated (e.g., daily, weekly, etc.), the scan verdicts are flushed and file scanning is restarted based on newer virus signatures. A comparison between the version of the virus signatures available to destination "SVM2" 140B and the version used by source "SVM1" 140A may be made based on state information 170A (see information relating to "virus signature version" and "date" in FIG. 1).

If destination "SVM2" 140B has newer virus signatures compared to source "SVM1" 140A, only an incremental file scan is performed for newer virus signatures and cached verdict information 160A flushed. Otherwise, if destination "SVM2" 140B has older or the same virus signatures as source "SVM1" 140A, cached verdict information 160A may be retained at "VM1" 410B and a file scan resumed based on state information 170A. In addition, since state information 170A includes hash information of system-critical files (e.g., program files, web browser files, etc.), destination "SVM2" 140B avoids having to recalculate the hash information, thereby avoiding such CPU- and disk-intensive operations.

Example 2: Virtual Machine Fault Tolerance

Figure 5:
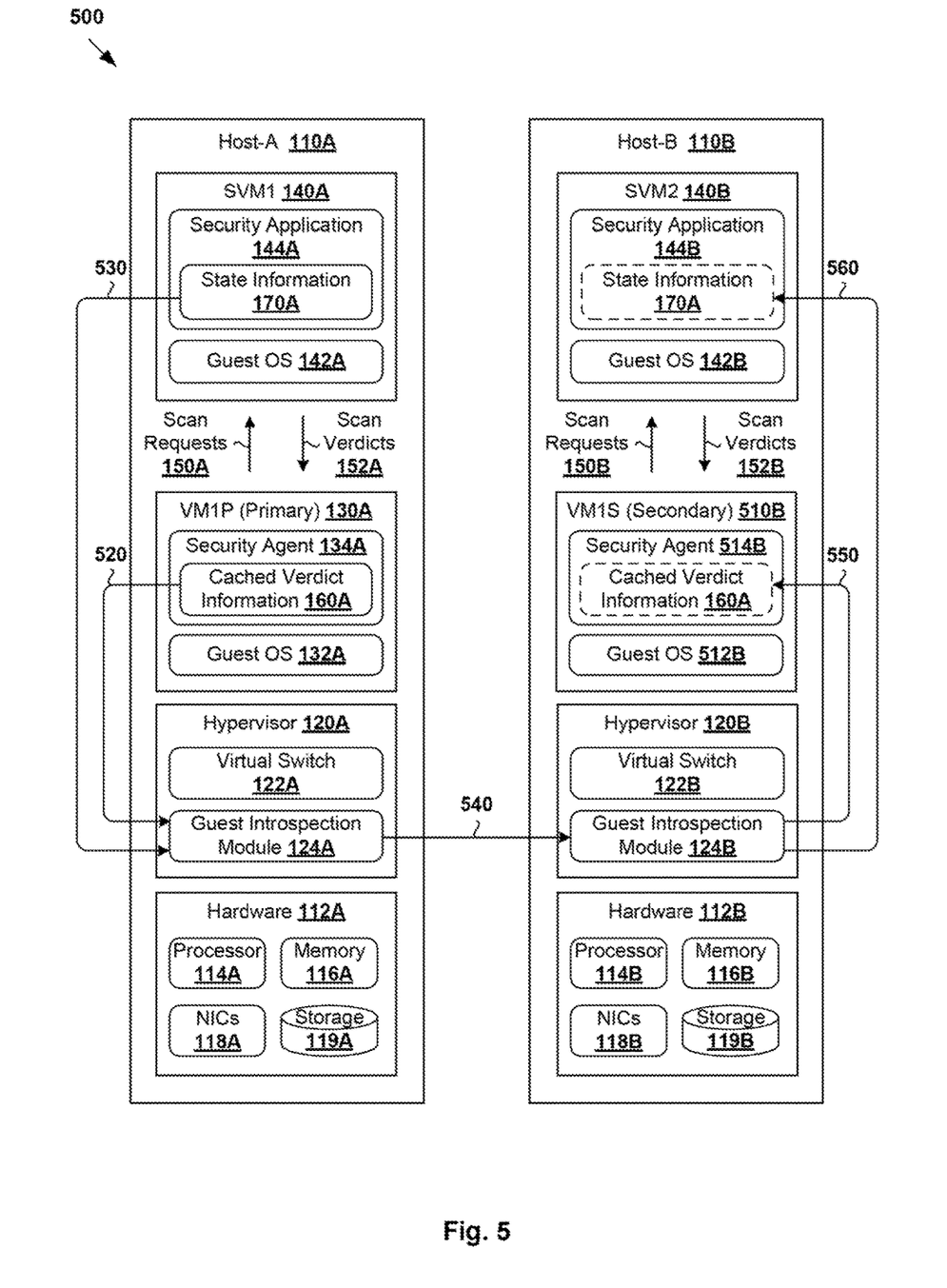
FIG. 5 is a schematic diagram illustrating a second example virtualized computing environment in which security system information is maintained according to the example process in FIG. 3.

In relation to an operation to provide fault tolerance for "VM1" 130A, FIG. 5 is a schematic diagram illustrating second example virtualized computing environment 500 in which security system information is maintained according to example process 300 in FIG. 3. Although an example is shown, it should be understood that virtualized computing environment 500 in FIG. 5 may include additional or alternative components, and each component may have a different configuration.

In the example in FIG. 5, virtual machine high availability (HA) is used to provide fault tolerance for virtual machines. In particular, continuous availability is provided to a primary virtual machine labelled "VM1P" 130A on Host-A 110A by creating and maintaining a secondary virtual machine labelled "VM1S" 510B on Host-B 110B. The primary and secondary virtual machines are usually deployed in different fault domains (e.g., different hosts, racks, pods, etc.). In the event of an outage such as a host or network failure, "VM1S" 510B will be able to replace "VM1P" 130A to continue its operations.

Primary "VM1P" 130A and secondary "VM1S" 510B form a fault-tolerant pair by exchanging heartbeat information with each other. The heartbeat information includes information relating to all inputs and events that occur on primary "VM1P" 130A to maintain "VM1S" 510B in a virtual lockstep with primary "VM1P" 130A. According to examples of the present disclosure, fault tolerance may be enhanced by extending the heartbeat information between a fault-tolerant pair to include cached verdict information 160A of primary "VM1P" 130A and state information 170A of "SVM1" 140A.

Referring first to 520 and 530 in FIG. 5, based on an operation to provide fault tolerance for primary "VM1P" 130A, guest introspection module 124A at Host-A 110A obtains cached verdict information 160A from primary "VM1P" 130A ("source virtualized computing instance") and state information 170A from "SVM1" 140A ("source security virtualized computing instance"). At 540 in FIG. 5, guest introspection module 124A sends cached verdict information 160A and state information 170A to guest introspection module 124B, such as part of the heartbeat information exchange process. See corresponding blocks 310 and 370 in FIG. 3.

At 550 and 560 in FIG. 5, guest introspection module 124B at Host-B 110B sends cached verdict information 160A to secondary "VM1S" 510B ("destination virtualized computing instance") and state information 170A to "SVM2" 140B ("destination security virtualized computing instance"). See corresponding blocks 380 and 385 in FIG. 3. Similar to primary "VM1P" 130A, secondary "VM1S" 510B implements an agent component in the form of security agent 514B on guest OS 512B. Similar to "SVM1" 140A, "SVM2" 140B implements security application 144B on guest OS 142B to provide scan verdicts 152B to "VM1" 410B based on scan requests 150B.

Based on cached verdict information 160A, security agent 514B of secondary "VM1S" 510B may maintain a virtual lockstep with security agent 134A of primary "VM1P" 130A. Further, based on state information 170A of "SVM1" 140A, security application 144B of "SVM2" 140B may maintain a virtual lockstep with security application 144A of "SVM1" 140A. Since "SVM2" 140B may rely on state information 170A, it is not necessary to repeat a full file scan for "VM1S" 510B in the event of a failover. Instead, "SVM2" 140B may perform an incremental file scan or resume a file scan based on state information 170A. Related discussions made with reference to FIG. 4 are also applicable here.

Example 3: Virtual Machine Deployment

Figure 6:
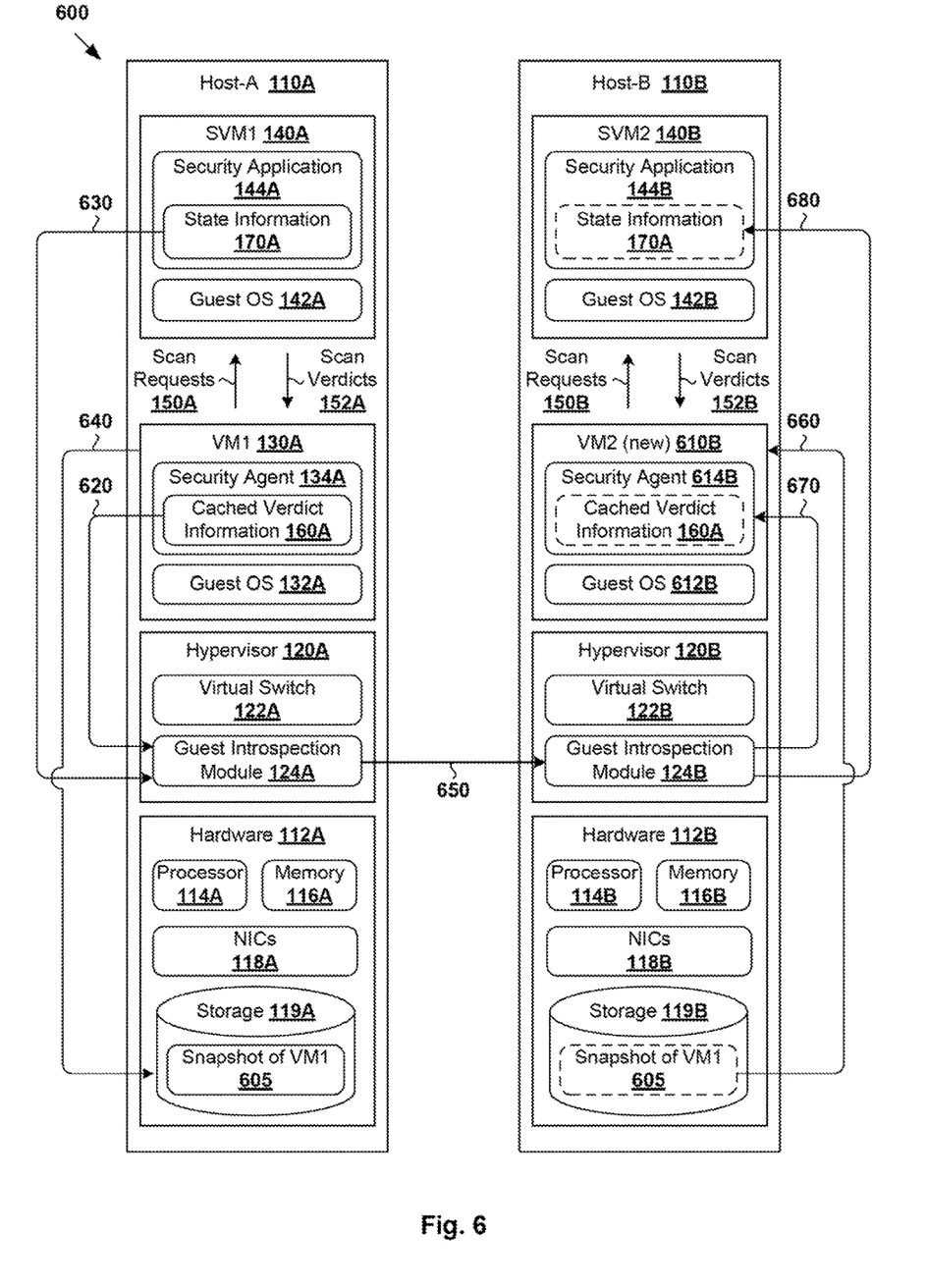
FIG. 6 is a schematic diagram illustrating a third example virtualized computing environment in which security system information is maintained according to the example process in FIG. 3.

In relation to an operation to deploy a new virtual machine based on "VM1" 130A, FIG. 6 is a schematic diagram illustrating third example virtualized computing environment 600 in which security system information is maintained according to example process 300 in FIG. 3. Although an example is shown, it should be understood that virtualized computing environment 600 in FIG. 6 may include additional or alternative components, and each component may have a different configuration.

In the example in FIG. 6, "VM2" 610B on lost-B 110B represents a new virtual machine to be deployed based on a snapshot of "VM1" 130A on Host-A 110A. In one example, "VM2" 610B may represent a linked clone of "VM1" 130A. Here, the term "linked clone" may refer generally to a copy of an existing virtual machine (also known as a parent) that is made from a snapshot of the parent. In this case, all files available on "VM1" 130A when the snapshot is created will continue to remain available to its linked clone "VM2" 610B. However, ongoing changes to a virtual disk of parent "VM1" 130A do not affect linked clone "VM2" 610B. In another example, "VM2" 610B on Host-B 110B may represent a new virtual machine deployed, from a virtual machine template generated from snapshot 605 "VM1" 130A.

According to examples, of the present disclosure, virtual machine deployment may be improved by maintaining and transferring cached verdict information 160A of "VM1" 130A and state information 170A of "SVM1" 140A from Host-A 110A to Host-B 110B. The example in FIG. 6 may be performed triggered by instructions to deploy "VM2" 610B on Host-B 110B, such as from a management entity (e.g., VMware's vCenter, etc.).

Referring to 620 and 630 in FIG. 6, guest introspection module 124A obtains cached verdict information 160A from "VM1" 130A ("source virtualized computing instance") and state information 170A from "SVM1" 140A ("source security virtualized computing instance"). At 640 in FIG. 6, snapshot 605 of "VM1" 130A is created and stored, for example, in storage 119A. At 650 in FIG. 6, as part of the deployment operation, guest introspection module 124A at Host-A 110A sends snapshot 605 of "VM1" 130A, cached verdict information 160A, state information 170A to guest introspection module 124B at Host-B 110B. At Host-B 110B, snapshot 605 may be stored in, for example, storage 119B. See corresponding blocks 310 and 370 in FIG. 3.

At 660 in FIG. 6, new "VM2" 610B is deployed from snapshot 605 of "VM1" 130A. Similar to "VM1" 130A, "VM2" 610B implements security agent 614B on guest OS 612B. At Host-B 110B, "SVM2" 140B implements security application 144B on guest OS 142B to perform security checks for "VM2" 610B. To facilitate this, at 670 and 680 in FIG. 6, guest introspection module 124B at Host-B 110B sends cached verdict information 160A to "VM2" 610B ("destination virtualized computing instance") and state information 170A to "SVM2" 140B ("destination security virtualized computing instance"). See corresponding blocks 380 and 385 in FIG. 3.

Once deployed, new "VM2" 610B may rely on file scan verdicts in cached verdict information 160A. Since "SVM2" 140B may rely on state information 170A, it is not necessary to perform a full file scan for "VM2" 610B. Similar to the examples in FIG. 4 and FIG. 5, "SVM2" 140B may perform an incremental file scan or resume a file scan, and related discussions made with reference to FIG. 4 are also applicable here. Similar to "SVM1" 140A, "SVM2" 140B implements security application 144B on guest OS 142B to provides scan verdicts 152B to "VM2" 610B after performing security checks in response to scan requests 150B from "VM2" 610B.

Although explained using an example to deploy "VM2" 610B on a different Host-B 110B, it should be understood that the new virtual machine may also be deployed on the same Host-A 110A. Conventionally, "SVM1" 140A will not be able to associate state information 170A associated with parent "VM1" 140A to the newly deployed virtual machine. According to examples of the present disclosure, guest introspection module 124A may similarly copy state information 170A from "SVM1" 140A and cached verdict information 160A from "VM1" 130A. After the new virtual machine is deployed on Host-A 110A, cached verdict information 160A is sent to the new virtual machine, and state information 170A sent to "SVM1" 140A with an indication that it is associated with the new virtual machine. This may be repeated every time a new virtual machine is deployed on the same host, and the state information associated with the parent virtual machine may be copied and reused.

Example 4: Virtual Machine Suspension and Resumption

Figure 7:
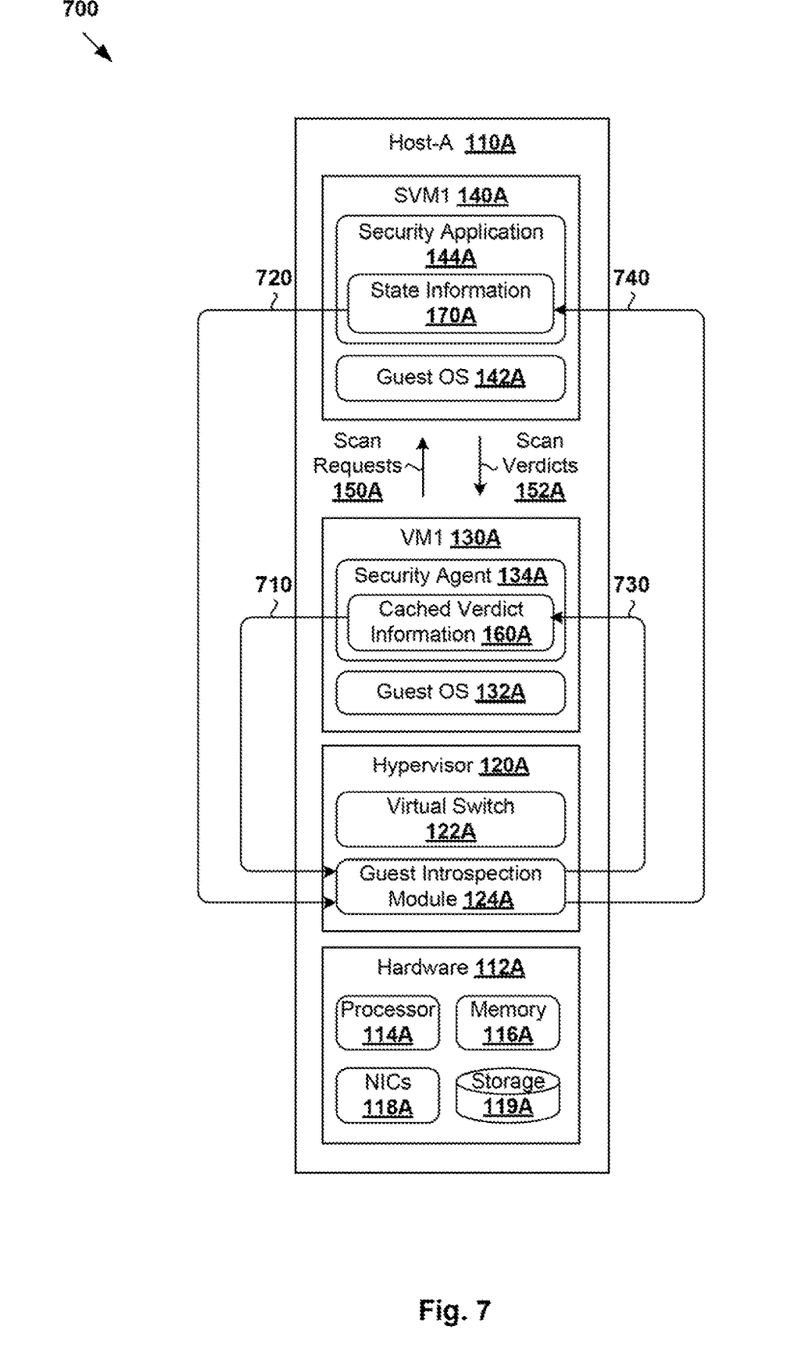
FIG. 7 is a schematic diagram illustrating a fourth example virtualized computing environment in which security system information is maintained according to the example process in FIG. 3.

In relation to an operation to suspend and resume "VM1" 130A, FIG. 7 is a schematic diagram illustrating fourth example virtualized computing environment 700 in which security system information is maintained during virtual machine suspension and resumption according to example process 300 in FIG. 3. Although an example is shown, it should be understood that virtualized computing environment 700 in FIG. 7 may include additional or alternative components, and each component may have a different configuration.

In the example in FIG. 7, it may be desirable to suspend "VM1" 130A, such as for power management purposes to reduce the power consumption of Host-A 110A, etc. As used herein, the term "suspend" may refer generally to temporarily pausing, disabling or deactivating operations of a virtual machine similar to entering a physical machine into a standby, sleep or hibernate mode. Once resumed from suspension, applications that were running before "VM1" 130A was suspended may resume in their running state.

However, conventionally, cached verdict information 160A of "VM1" 130A will be lost during the suspension. Once resumed, a connection needs to be re-established between "VM1" 130A and "SVM1" 140A via guest introspection module 124A. "SVM1" 140A then re-initiates a full scan for "VM1" 130A to repeat various security checks (see 174A in FIG. 1). Similar to the examples in FIG. 4 to FIG. 6, a full scan is resource-intensive and causes performance overhead at Host-A 110A.

According to examples of the present disclosure, virtual machine suspension and resumption may be improved by maintaining cached verdict information 160A of "VM1" 130A and state information 170A of "SVM1" 140A. In particular, at 710 and 720 in FIG. 7, during a suspension operation, guest introspection module 124A obtains cached verdict information 160A from "VM1" 130A ("source virtualized computing instance") and state information 170A from "SVM1" 140A ("source security virtualized computing instance"). See corresponding, blocks 310 to 360 in FIG. 3.

In the example in FIG. 7, the respective destinations of cached verdict information 160A and state information 170A are on the same Host-A 110A. At 730 in FIG. 7, once "VM1" 130A is resumed from suspension, guest introspection module 124A restores cached verdict information 160A on "VM1" 130A ("destination virtualized computing instance"). Further, at 740 in FIG. 7, guest introspection module 124A sends "SVM1" 140A ("destination security virtualized computing instance") state information 170A obtained from "SVM1" 140A prior to the suspension. See corresponding block 390 in FIG. 3. Using state information 170A, it is not necessary for "SVM1" 140A to re-initiate a full scan, and related discussions made with reference to FIG. 4 are also applicable here.

The above may also be implemented responsive to an operation to power on and power off "VM1" 130A. For example, in response to detecting an operation to power off "VM1" 130A by shutting it down gracefully, security agent 134A may provide cached verdict information 160A to guest introspection module 124A. When an operation to power on "VM1" 130A is detected, guest introspection module 124A may restore cached verdict information 160A on "VM1" 130A by sending it to security agent 134A, thereby improving the performance of security agent 134A.

Example 5: Load Balancing

Figure 8:
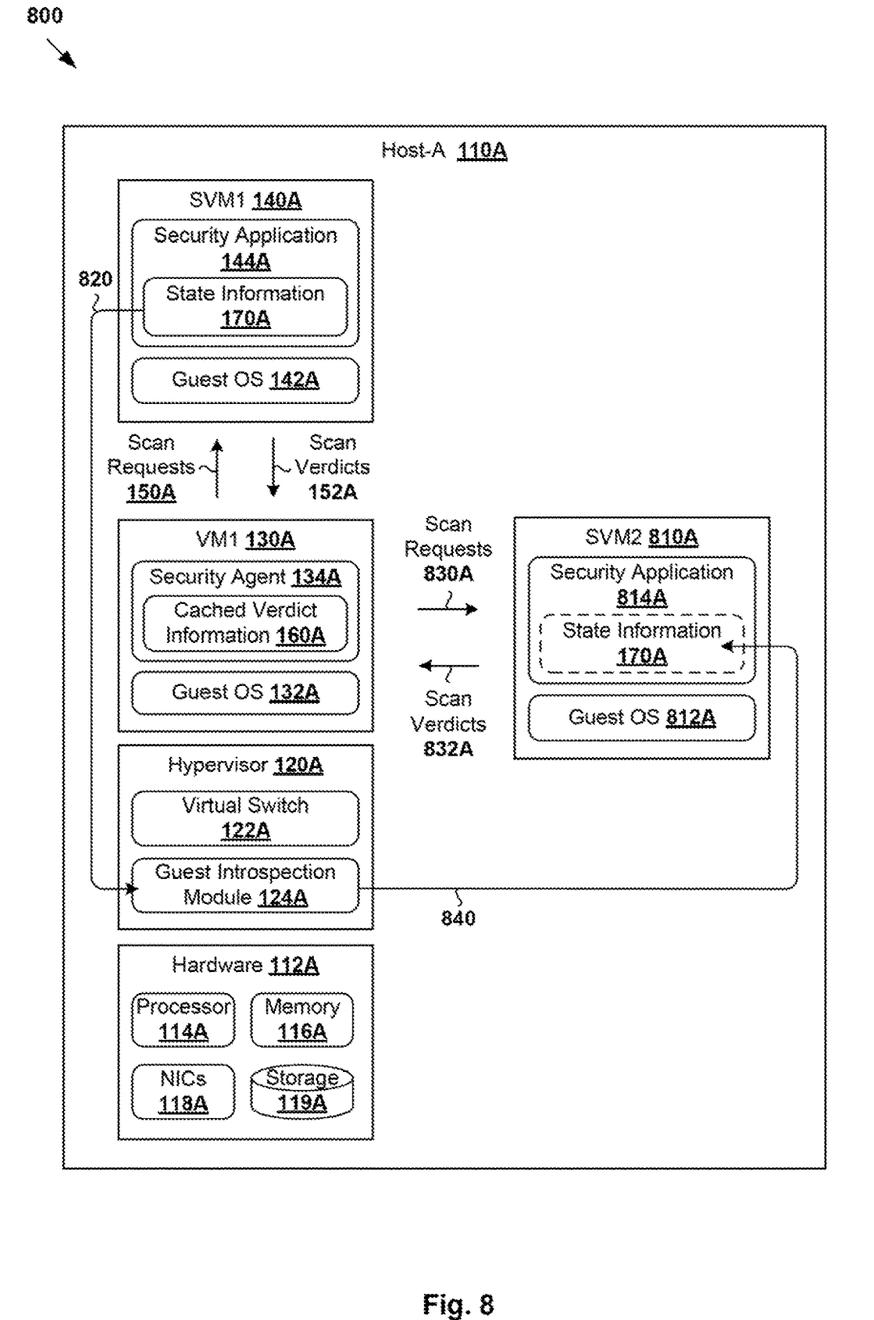
FIG. 8 is a schematic diagram illustrating a fifth example virtualized computing environment in which security system information is maintained according to the example process in FIG. 3.

In relation to an operation to assign another security virtual machine to secure "VM1" 130A, FIG. 8 is a schematic diagram illustrating fifth example virtualized computing environment 800 in which security system information is maintained according to example process 300 in FIG. 3. Although an example is shown, it should be understood that virtualized computing environment 800 in FIG. 8 may include additional or alternative components, and each component may have a different configuration. In virtualized computing environment 800, "SVM1" 140A is an example "source security virtualized computing instance" and "SVM2" 810A is an example "destination security virtualized computing instance."

In the example in FIG. 8, it may be desirable to implement load balancing among security virtual machines, such as when a resource utilization level at "SVM1" 140A on Host-A 110A exceeds a predetermined level. Here, the term "resource utilization level" may refer generally to any suitable combination (e.g., weighted value) of a CPU utilization level, memory utilization level, storage utilization level, etc. In practice, the resource utilization level of "SVM1" 140A may be monitored using guest introspection module 124A, or any other suitable module.

In response to determination that the resource utilization level of "SVM1" 140A exceeds the predetermined threshold, "SVM2" 810A may be assigned to secure "VM1" 130A, thereby transferring the responsibility to perform security checks from "SVM1" 140A to "SVM2" 810A. According to examples of the present disclosure, load balancing among security virtual machines may be improved by maintaining state information 170A of "SVM1" 140A for use by "SVM2" 810A. Referring to 820 in FIG. 8, based on a load balancing operation, guest introspection module 124A obtains state information 170A from "SVM1" 140A. See corresponding blocks 310 to 330 in FIG. 3. State information 170A may be stored in storage 119A on Host-A 110A.

To transfer the responsibility to secure "VM1" 130A, "VM1" 130A is disconnected from "SVM1" 140A and connected to "SVM2" 810A instead. The connection allows "VM1" 130A to send scan requests 830A based on file events to, and receive scan verdicts 832A from "SVM2" 810A. In practice, "SVM2" 810A may be an existing security virtual machine or newly deployed for load balancing purposes.

Similar to the example in FIG. 7, since "SVM1" and "SVM2" 810A are both on the same Host-A 110A, it is not necessary for Host-A 110A to send any information to another host. At 840 in FIG. 8, guest introspection module 124A sends state information 170A to "SVM2" 810A for reuse. For example, instead of repeating a full scan, "SVM2" 810A may rely on state information 170A to resume a scan performed by "SVM1" 140A or perform an incremental scan if virus signatures have been updated. See corresponding blocks 360 and 390 in FIG. 3. Related discussions made with reference to FIG. 4 are also applicable here.

Although explained using a load balancing example, the responsibility to secure "VM1" 130A may be transferred in other situations, such as when a failure is detected at "SVM1" 140A, etc. In this case, similar to the fault tolerance example in FIG. 5, "SVM1" 140A and "SVM2" 810A may form a fault-tolerant pair.

Computing System

Figure 9:
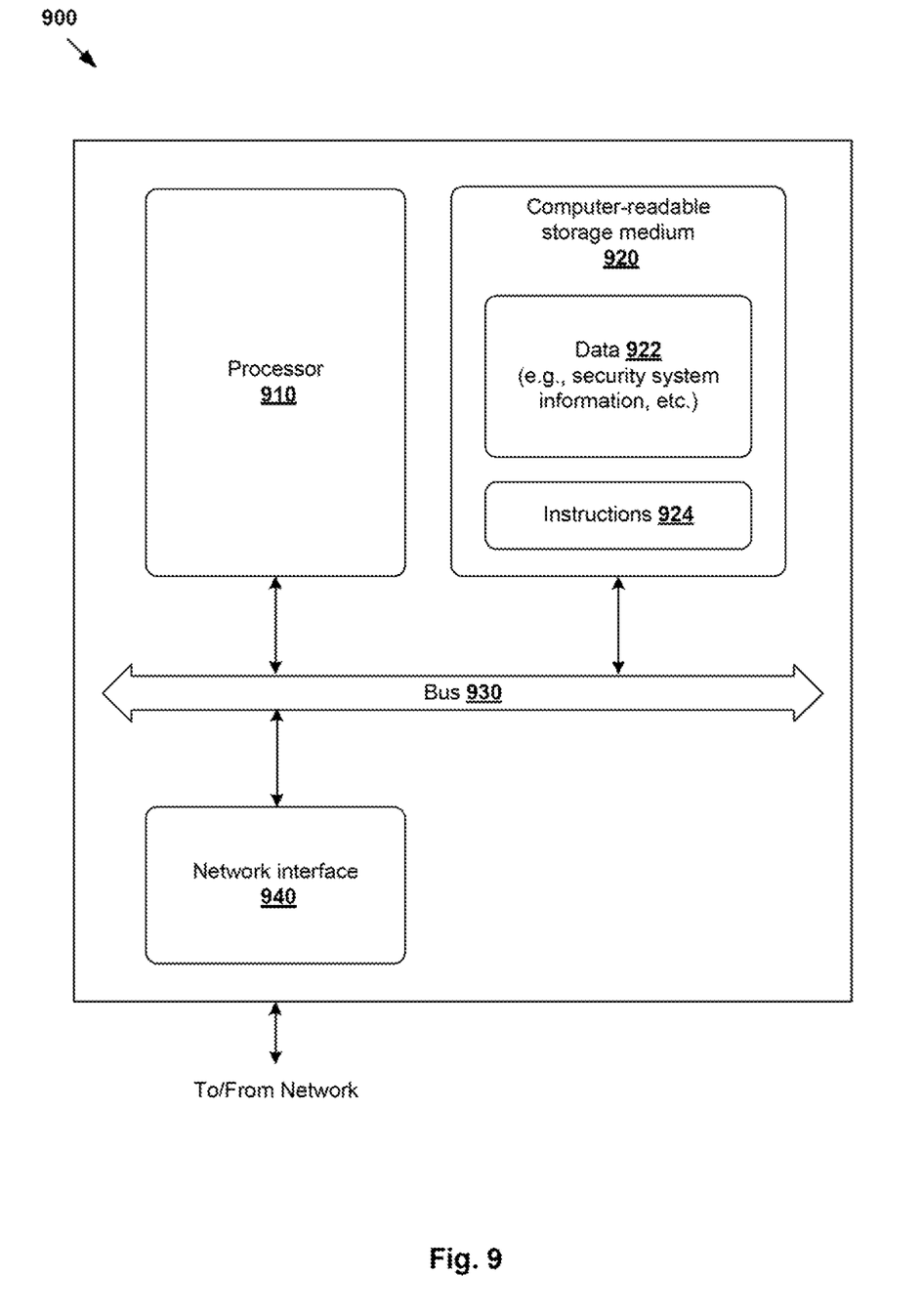
FIG. 9 is a schematic diagram illustrating an example commuting system.

The above, examples can be implemented by hardware (including hardware logic circuitry), software or firmware or a combination thereof. FIG. 9 is a schematic diagram illustrating example computing system 900 acting as host 110A/110B. Example computing system 900 may include processor 910, computer-readable storage medium 920, network interface 940, and bus 930 that facilitates communication among these illustrated components and other components.

Processor 910 is to perform processes described herein with reference to the drawings. Computer-readable storage medium 920 may store any suitable data 922, such as data relating to security virtual machines, virtual machines, etc. Computer-readable storage medium 920 may further store computer-readable instructions 924 ("program code") that, in response to execution by processor 910, cause processor 910 to perform processes described herein with reference to FIG. 1 to FIG. 8.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), programmable switch architectures, and others. The term 'processor' is to be interpreted broadly to include a processing unit, ASIC, logic unit, or programmable gate array, etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g. as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PFD1), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, where the elements or procedure shown in the drawings are not necessarily essential for implementing the present disclosure. Those skilled in the art will understand that elements in the examples can be arranged in the device in the examples as described, or can be alternatively located in one or more devices different from that in the examples. The elements in the examples described can be combined into one module or further divided into a plurality of sub-elements.

What is claimed is:

1. A method for a host to maintain security system information in a virtualized computing environment, the host supporting a security system to secure a source virtualized computing instance, wherein the method comprises:

based on an operation associated with the source virtualized computing instance, determining to maintain security system information associated with the security system;

obtaining the security system information that includes first information from the source virtualized computing instance through a first connection between the source virtualized computing instance and a hypervisor configured to implement a third component of the security system and support the source virtualized computing instance and the source security virtualized computing instance, or second information from a source security virtualized computing instance through a second connection between the source security virtualized computing instance and the hypervisor, or both, wherein the source virtualized computing instance implements a first component of the security system that is configured to send a request to the source security virtualized computing instance in response to having detected an event occurring within the source virtualized computing instance, and the source security virtualized computing instance implements a second component of the security system that is configured to perform a security check in response to receiving the request from the source virtualized computing instance; and sending the first information to a destination virtualized computing instance, or the second information to a destination security virtualized computing instance, or both.

2. The method of claim 1, wherein the obtaining the security system information that includes the first information comprises:

obtaining, from the source virtualized computing instance, cached verdict information associated with the security check performed by the second component of the security system based on the respective event detected by the first component of the security system.

3. The method of claim 1, wherein the obtaining the security system information that includes the second information comprises:

obtaining, from the source security virtualized computing instance, state information associated with one or more security checks performed, or to be performed, by the second component of the security system to secure the source virtualized computing instance.

4. The method of claim 1, wherein the determining to maintain the security system information comprises:

detecting the operation associated with the source virtualized computing instance; and based on the operation, determining whether to maintain the first information or the second information, or both.

5. The method of claim 1, wherein the determining to maintain security system information is based on one of the following operations:

an operation to migrate the source virtualized computing instance from the host to a destination host, wherein the destination virtualized computing instance represents the source virtualized computing instance after being migrated to the destination host;

an operation to provide fault tolerance for the source virtualized computing instance, wherein the destination virtualized computing instance is to replace the source virtualized computing instance in the event of a failover by maintaining a virtual lockstep with the source virtualized computing instance;

an operation to deploy the destination virtualized computing instance based on the source virtualized computing instance;

an operation to suspend the source virtualized computing instance, wherein the destination virtualized computing instance represents the source virtualized computing instance after being resumed from suspension;

an operation to power off the source virtualized computing instance, wherein the destination virtualized computing instance represents the source virtualized computing instance after being powered on; and an operation to assign the destination security virtualized computing instance to secure the source virtualized computing instance.

6. The method of claim 1, wherein the sending the first information or second information, or both, comprises:

determining that the destination virtualized computing instance or destination security virtualized computing instance, or both, are on a destination host that is different to the host; and sending the first information or the second information, or both, to the destination host.

7. The method of claim 1, wherein the sending the first information or second information, or both, comprises:

determining that the destination virtualized computing instance or destination security virtualized computing instance, or both, are on the host; and sending the first information to the destination virtualized computing instance on the host, or the second information to the destination security virtualized computing instance on the host, or both.

8. A non-transitory computer-readable storage medium comprising instructions, which when executed in a computing system, cause the computing system to perform a method for maintaining security system information in a virtualized computing environment, the computing system supporting a security system to secure a source virtualized computing instance, wherein the method comprises:

based on an operation associated with the source virtualized computing instance, determining to maintain security system information associated with the security system;

obtaining the security system information that includes first information from the source virtualized computing instance through a first connection between the source virtualized computing instance and a hypervisor configured to implement a third component of the security system and support the source virtualized computing instance and the source security virtualized computing instance, or second information from a source security virtualized computing instance through a second connection between the source security virtualized computing instance and the hypervisor, or both, wherein the source virtualized computing instance implements a first component of the security system that is configured to send a request to the source security virtualized computing instance in response to having detected an event occurring within the source virtualized computing instance, and the source security virtualized computing instance implements a second component of the security system that is configured to perform a security check in response to receiving the request from the source virtualized computing instance; and sending the first information to a destination virtualized computing instance, or the second information to a destination security virtualized computing instance, or both.

9. The non-transitory computer-readable storage medium of claim 8, wherein the obtaining the security system information that includes the first information comprises:

obtaining, from the source virtualized computing instance, cached verdict information associated with the security check performed by the second component of the security system based on the respective event detected by the first component of the security system.

10. The non-transitory computer-readable storage medium of claim 8, wherein the obtaining the security system information that includes the second information comprises:

obtaining, from the source security virtualized computing instance, state information associated with one or more security checks performed, or to be performed, by the second component of the security system to secure the source virtualized computing instance.

11. The non-transitory computer-readable storage medium of claim 8, wherein the determining to maintain the security system information comprises:

detecting the operation associated with the source virtualized computing instance; and based on the operation, determining whether to maintain the first information or the second information, or both.

12. The non-transitory computer-readable storage medium of claim 8, wherein the determining to maintain security system information is based on one of the following operations:

an operation to migrate the source virtualized computing instance from the computing system to a destination host, wherein the destination virtualized computing instance represents the source virtualized computing instance after being migrated to the destination host;

an operation to provide fault tolerance for the source virtualized computing instance, wherein the destination virtualized computing instance is to replace the source virtualized computing instance in the event of a failover by maintaining a virtual lockstep with the source virtualized computing instance;

an operation to deploy the destination virtualized computing instance based on the source virtualized computing instance;

an operation to suspend the source virtualized computing instance, wherein the destination virtualized computing instance represents the source virtualized computing instance after being resumed from suspension;

an operation to power off the source virtualized computing instance, wherein the destination virtualized computing instance represents the source virtualized computing instance after being powered on; and an operation to assign the destination security virtualized computing instance to secure the source virtualized computing instance.

13. The non-transitory computer-readable storage medium of claim 8, wherein the sending the first information or second information, or both, comprises:

determining that the destination virtualized computing instance or destination security virtualized computing instance, or both, are on a destination host that is different to the computing system; and sending the first information or the second information, or both, to the destination host.

14. The non-transitory computer-readable storage medium of claim 8, wherein the sending the first information or second information, or both, comprises:
 determining that the destination virtualized computing instance or destination security virtualized computing instance, or both, are on the computing system; and
 sending the first information to the destination virtualized computing instance on the computing system, or the second information to the destination security virtualized computing instance on the computing system, or both.

15. A computing system, comprising:
 a processor; and
 a non-transitory computer-readable medium having stored thereon program code that, upon being executed by the processor, causes the processor to:
  based on an operation associated with a source virtualized computing instance supported by the computing system, determine to maintain security system information associated with a security system, wherein the security system is to secure the source virtualized computing instance;
  obtain the security system information that includes first information from the source virtualized computing instance through a first connection between the source virtualized computing instance and a hypervisor configured to implement a third component of the security system and support the source virtualized computing instance and the source security virtualized computing instance, or second information from a source security virtualized computing instance through a second connection between the source security virtualized computing instance and the hypervisor, or both, wherein the source virtualized computing instance implements a first component of the security system that is configured to send a request to the source security virtualized computing instance in response to having detected an event occurring within the source virtualized computing instance, and the source security virtualized computing instance implements a second component of the security system that is configured to perform a security check in response to receiving the request from the source virtualized computing instance; and
  send the first information to a destination virtualized computing instance, or the second information to a destination security virtualized computing instance, or both.

16. The computing system of claim 15, wherein program code for obtaining the security system information that includes the first information causes the processor to:
 obtain, from the source virtualized computing instance, cached verdict information associated with the security check performed by the second component of the security system based on the respective event detected by the first component of the security system.

17. The computing system of claim 15, wherein program code for obtaining the security system information that includes the second information causes the processor to:
 obtain, from the source security virtualized computing instance, state information associated with one or more security checks performed, or to be performed, by the second component of the security system to secure the source virtualized computing instance.

18. The computing system of claim 15, wherein program code for determining to maintain the security system information causes the processor to:
 detect the operation associated with the source virtualized computing instance; and
 based on the operation, determine whether to maintain the first information or the second information, or both.

19. The computing system of claim 15, wherein program code for determining to maintain security system information causes the processor to perform the determination based on one of the following operations:
 an operation to migrate the source virtualized computing instance from the computing system to a destination host, wherein the destination virtualized computing instance represents the source virtualized computing instance after being migrated to the destination host;
 an operation to provide fault tolerance for the source virtualized computing instance, wherein the destination virtualized computing instance is to replace the source virtualized computing instance in the event of a failover by maintaining a virtual lockstep with the source virtualized computing instance;
 an operation to deploy the destination virtualized computing instance based on the source virtualized computing instance;
 an operation to suspend the source virtualized computing instance, wherein the destination virtualized computing instance represents the source virtualized computing instance after being resumed from suspension;
 an operation to power off the source virtualized computing instance, wherein the destination virtualized computing instance represents the source virtualized computing instance after being powered on; and
 an operation to assign the destination security virtualized computing instance to secure the source virtualized computing instance.

20. The computing system of claim 15, wherein program code for sending the first information or second information, or both, causes the processor to:
 determine that the destination virtualized computing instance or destination security virtualized computing instance, or both, are on a destination host that is different to the computing system; and
 send the first information or the second information, or both, to the destination host.

21. The computing system of claim 15, wherein program code for sending the first information or second information, or both, causes the processor to:
 determine that the destination virtualized computing instance or destination security virtualized computing instance, or both, are on the computing system; and
 send the first information to the destination virtualized computing instance on the computing system, or the second information to the destination security virtualized computing instance on the computing system, or both.

* * * * *

UNITED STATES PATENT AND TRADEMARK OFFICE
CERTIFICATE OF CORRECTION

PATENT NO. : 10,528,375 B2
APPLICATION NO. : 15/299490
DATED : January 7, 2020
INVENTOR(S) : Rayanagouda Bheemanagouda Patil et al.

Page 1 of 1

It is certified that error appears in the above-identified patent and that said Letters Patent is hereby corrected as shown below:

On the Title Page

Item (12), immediately under "United States Patent," delete "Rayanagouda et al." and insert -- Patil et al. --, therefor.

Item (72), under "Inventors," delete "Patil Rayanagouda, Pune (IN)" and insert -- Rayanagouda Bheemanagouda Patil, Pune (IN) --, therefor.

Signed and Sealed this
Seventh Day of April, 2020

Andrei Iancu
*Director of the United States Patent and Trademark Office*